US010403107B2

(12) United States Patent
Hill et al.

(10) Patent No.: US 10,403,107 B2
(45) Date of Patent: Sep. 3, 2019

(54) PASSIVE OPTICAL DETECTION METHOD AND SYSTEM FOR VEHICLES

(71) Applicant: SRI International, Menlo Park, CA (US)

(72) Inventors: Richard Andrew Hill, Campbell, CA (US); Karen Marie Nashold, San Francisco, CA (US); Zachary Flom, Redwood City, CA (US); Erik Frank Matlin, San Jose, CA (US); Robert A. Brown, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 15/643,315

(22) Filed: Jul. 6, 2017

(65) Prior Publication Data

US 2018/0012461 A1    Jan. 11, 2018

Related U.S. Application Data

(60) Provisional application No. 62/359,558, filed on Jul. 7, 2016.

(51) Int. Cl.
| G08B 13/196 | (2006.01) |
| B64C 19/00 | (2006.01) |
| H04N 5/14 | (2006.01) |
| G06K 9/00 | (2006.01) |
| G06T 7/285 | (2017.01) |
| G06T 7/70 | (2017.01) |
| H04N 13/00 | (2018.01) |

(52) U.S. Cl.
CPC ........ *G08B 13/19604* (2013.01); *B64C 19/00* (2013.01); *G06K 9/00771* (2013.01); *G06T 7/285* (2017.01); *H04N 5/144* (2013.01); *G06T 7/70* (2017.01); *G06T 2207/10021* (2013.01); *G08B 13/19602* (2013.01); *H04N 2013/0085* (2013.01)

(58) Field of Classification Search
CPC ........ G08B 13/19604; G08B 13/19602; G06T 7/285; G06T 7/70; B64C 19/00; G06K 9/00771; H04N 5/144; G08G 1/0175; G08G 1/04; G08G 1/054
See application file for complete search history.

(56) References Cited

U.S. PATENT DOCUMENTS

| 2017/0032586 | A1* | 2/2017 | Cheatham, III | ........ G07C 5/008 |
| 2017/0053169 | A1* | 2/2017 | Cuban | ..................... H04N 7/185 |
| 2017/0132474 | A1* | 5/2017 | Matsumoto | .......... G08G 5/0082 |
| 2017/0358103 | A1* | 12/2017 | Shao | .......................... G01S 3/00 |

* cited by examiner

*Primary Examiner* — John R Schnurr
(74) *Attorney, Agent, or Firm* — Rutan & Tucker, LLP

(57) ABSTRACT

A system, method, and apparatus are discussed for a passive optical camera-based system to detect a presence of one or more vehicles with one or more cameras. A detection algorithm is applied to recognize of the presence of the one or more vehicles using one or more imaging processors and the one or more cameras to detect fluctuations in light intensity from scattered light and/or reflections off of that vehicle. Those scattered light and/or reflections are captured in images contained in a set of frames from the one or more cameras.

18 Claims, 10 Drawing Sheets

Figure 4    Tracking Algorithm

Cont.

The passive optical camera-based system uses a graphical user interface to display detection results in real time on the display screen. A composite image is generated in the graphical user interface and the detection results are a highlighted outline around a detected vehicle in a scene image on the display screen.
812

The passive optical camera-based system uses two or more cameras mounted in the system so that each camera is configured to scan designated regions of the sky to enhance coverage. The system interrupts a scan of at least two cameras and dwells on a potential detected vehicle and coordinates the at least two cameras to converge on the potential detected vehicle to get stereo data, either stereo vision and/or triangulation, for determining range to the vehicle detection candidate.
814

The passive optical camera-based system plots and stores 3D trajectories of the vehicle detection candidate.
816

The passive optical camera-based system uses path prediction logic to predict a motion in 3D of one or multiple vehicles. The coordinates of a detected vehicle are passed to the path prediction logic that will predict the motion in 3D of one or more vehicles and at least one of i) provide predicted coordinates to another system and ii) provide, on a display screen, the vehicle's location highlighted on the display screen in real time.
818

End

Fig. 8B

PASSIVE OPTICAL DETECTION METHOD AND SYSTEM FOR VEHICLES

RELATED APPLICATIONS

This application claims the benefit of and priority under 35 USC 119 to U.S. Provisional patent application Ser. No. 62/359,558, Titled "Optical method for detection of unmanned aerial vehicles," filed Jul. 7, 2016, and which is hereby incorporated in, in its entirety.

GOVERNMENT LICENSE RIGHTS

This invention was made with Government support under contract number HR0011-15-C-0148 awarded by the Defense Advanced Research Projects Agency. The Government has certain rights in this invention.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

FIELD

Embodiments of the design provided herein generally relate to passive optical detection systems.

BACKGROUND

Active drone detection systems have existed which give away the location of the drone detection system and cost more power to operate. Some other techniques include: (1) audio techniques that require multiple sensors in order to localize the threat, and are susceptible to interference from other noise sources (traffic, aircraft, industrial noise, insect noise, etc.) and are limited in useful range; (2) radar that is an active RF-emitting technique, large, costly, and limited in its ability to detect small largely non-metallic objects such as commercial vehicles; and (3) optical techniques that solely rely on motion or appearance-based object detection, which are susceptible to false alarms from birds, aircraft, and other airborne objects, typically require the drone to be moving rather than hovering in one spot, and cannot reliably identify the object of interest in a cluttered scene.

SUMMARY

Provided herein are various methods, apparatuses, and systems for a passive optical camera-based system.

In an embodiment, a passive optical camera-based system may detect a presence of one or more vehicles with one or more cameras. The passive optical camera-based system may apply a detection algorithm to recognize the presence of the one or more vehicles using one or more imaging processors and the one or more cameras to detect fluctuations in light intensity from scattered light and/or reflections off of that vehicle. Those scattered light and/or reflections are captured in images contained in a set of frames from the one or more cameras, which are processed by the detection algorithm and imaging processors. Note, a lack of active emissions from the passive optical camera-based system allows the detection algorithm and imaging processors to detect the presence of the one or more vehicles without giving away a presence of the passive optical camera-based system. Any portions of the detection algorithm implemented in software can be stored in an executable format in a memory and be executed by one or more processors.

These and other features of the design provided herein can be better understood with reference to the drawings, description, and claims, all of which form the disclosure of this patent application.

DRAWINGS

The drawings refer to some embodiments of the design provided herein in which.

Figure 5:
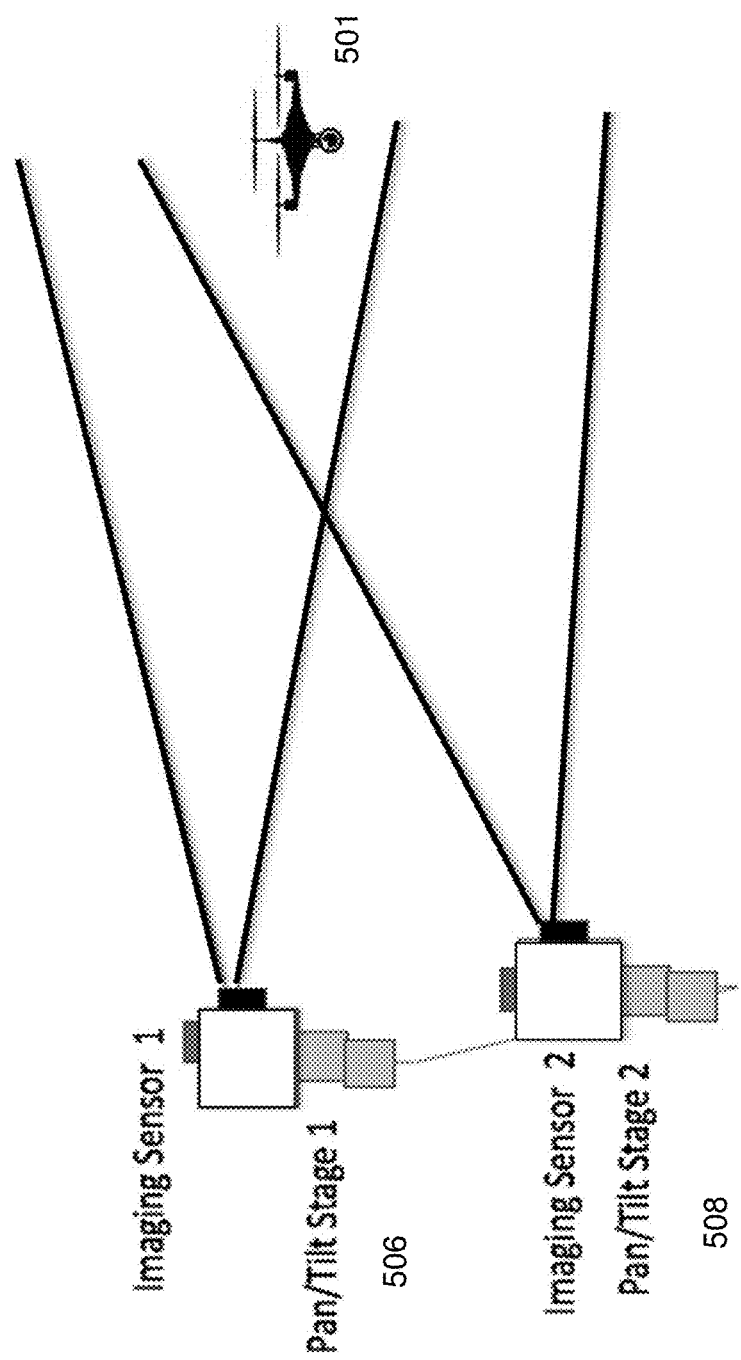

FIG. 5 illustrates a block diagram of an embodiment of two or more cameras that are mounted in the system so that each camera is configured to scan a designated region of the sky to maximize coverage, and when directed by a tracking algorithm and/or detection algorithm, then dwell on a potential detected vehicle and coordinate multiple cameras to converge on the potential detected vehicle to get stereo data for determining range to the vehicle detection candidate.

Figure 6:
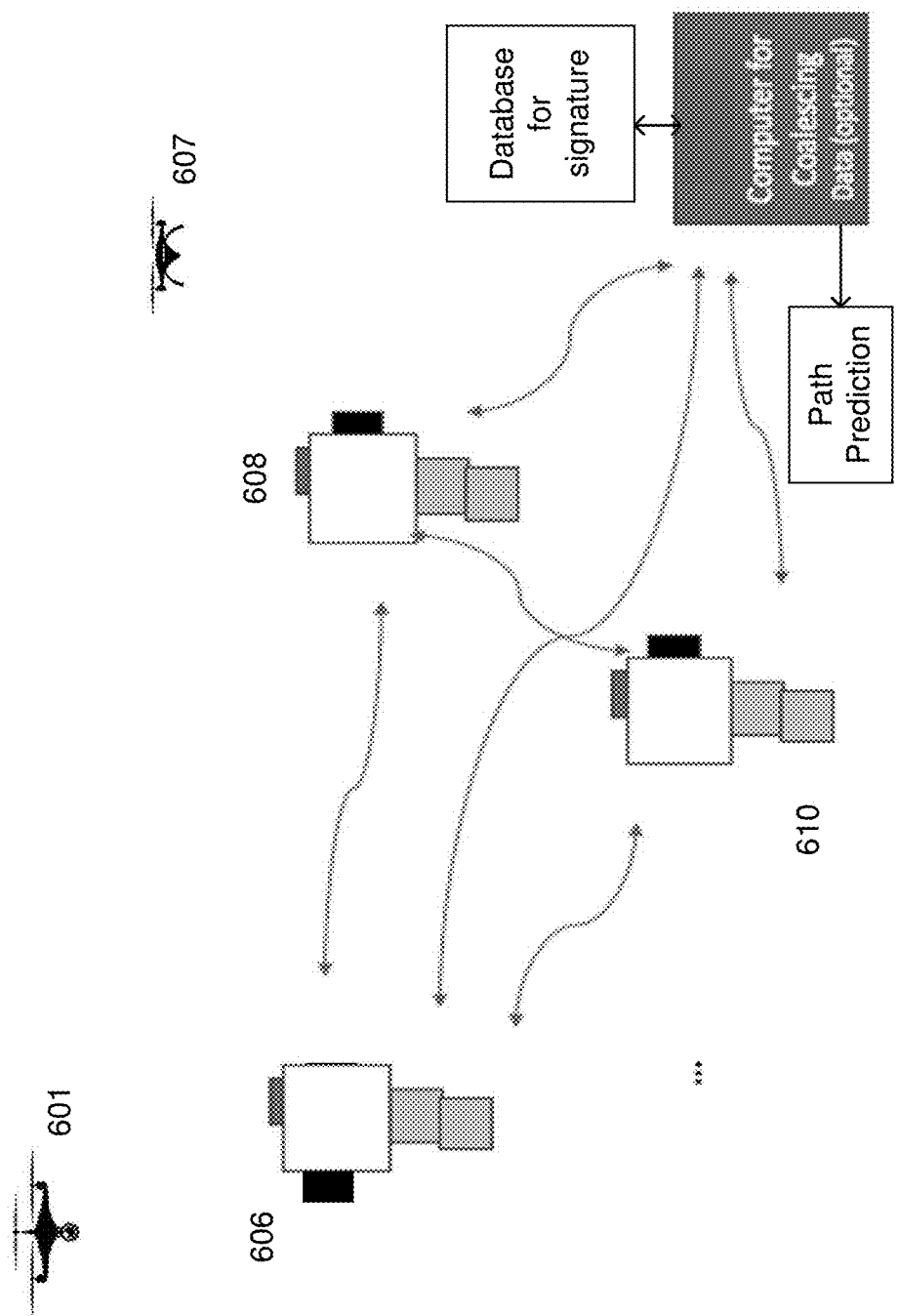

FIG. 6 illustrates a block diagram of an embodiment two more cameras that are networked together and used in concert to provide coverage of larger areas of terrain.

Figure 7:
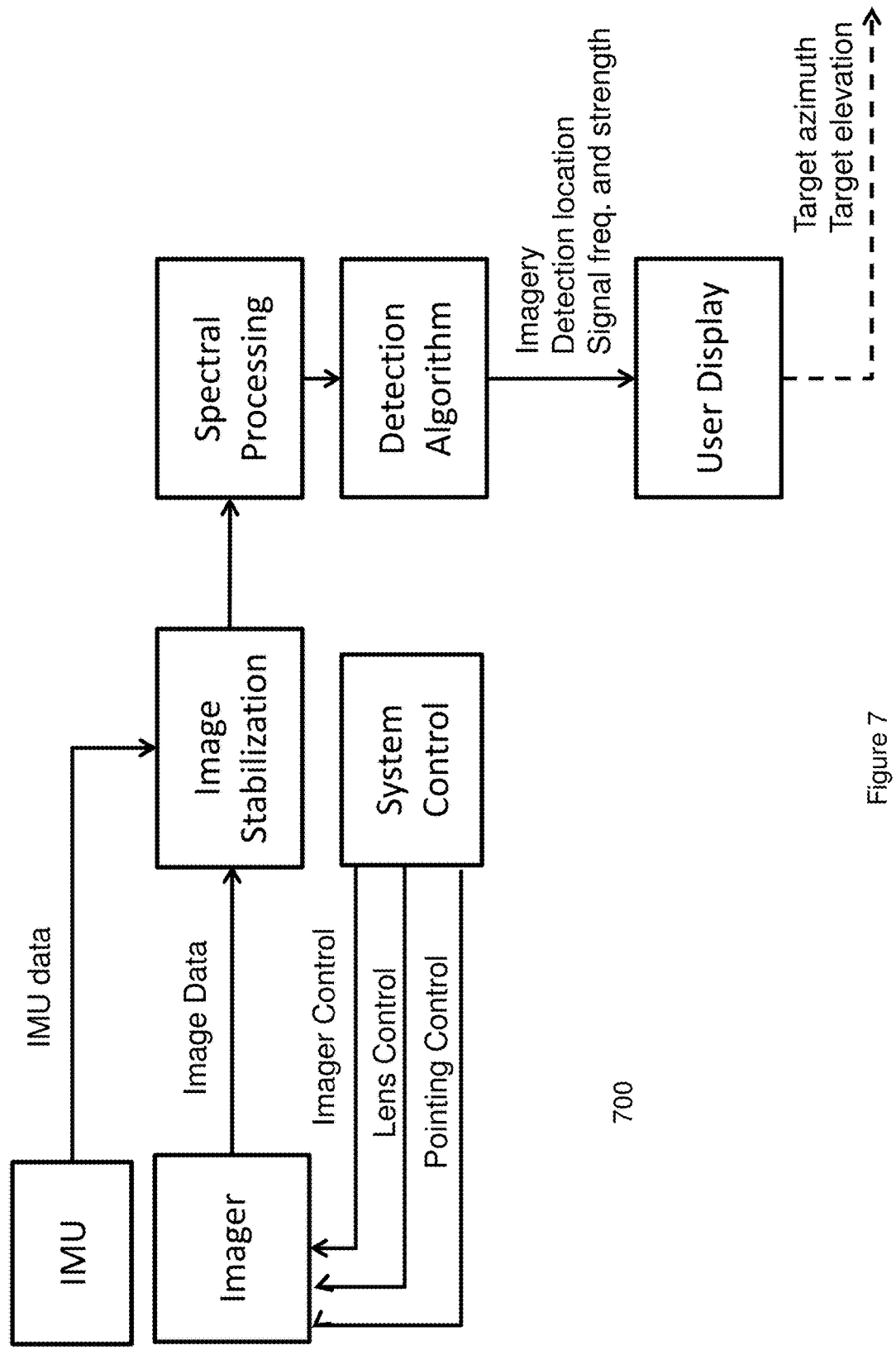

FIG. 7 illustrates a block diagram of an embodiment of a passive optical camera-based system with a real-time digital image stabilization program that i) combines data from an inertial measurement unit that measures a motion of a first camera and ii) then generates motion compensation data to correct data captured in the set of frames.

Figure 8A:
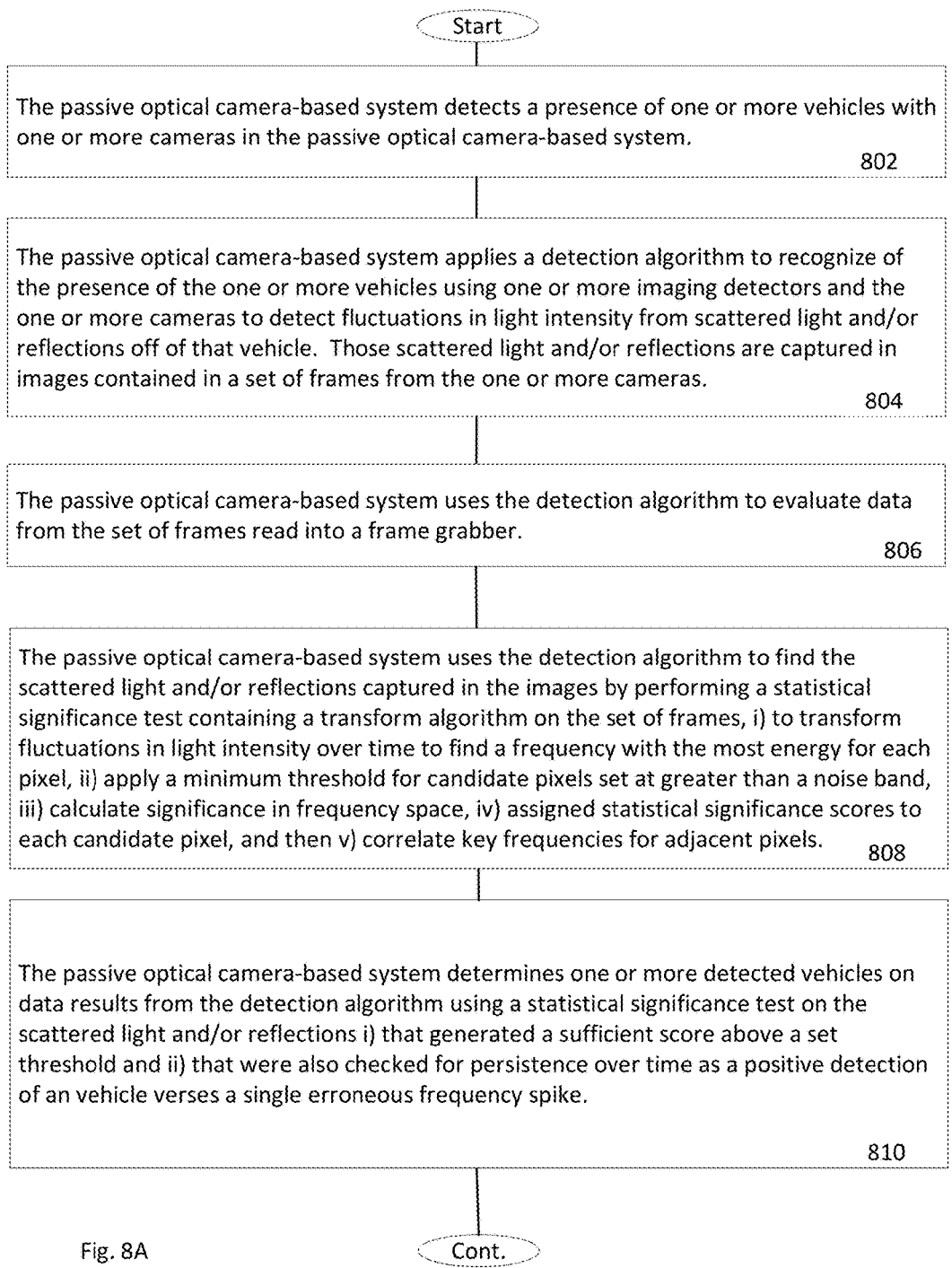

FIGS. 8A-8B illustrate flow diagrams of an embodiment of a passive optical camera-based system detecting vehicles.

Figure 9:
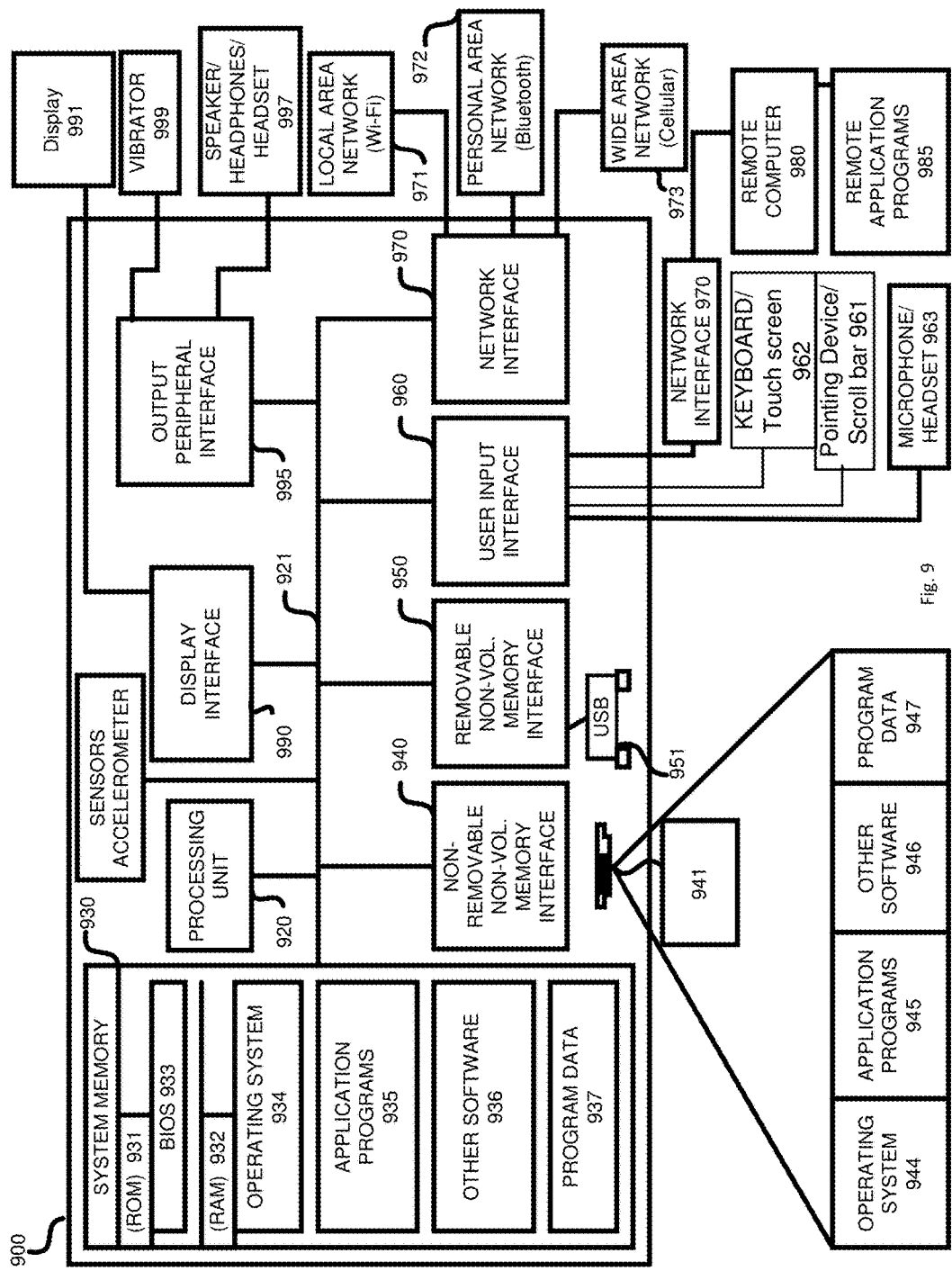

FIG. 9 illustrates an embodiment of one or more computing devices 900 that can be a part of the passive optical camera-based system.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first computing device, can be made. However, the specific numeric reference should not be interpreted as a literal sequential order but rather interpreted that the first computing device is different than a second computing device. Thus, the specific details set forth are merely exemplary. The specific details can be varied from and still be contemplated to be within the spirit and scope of the present design. The term "coupled" is defined as meaning connected either directly to the component or indirectly to the component through another component.

In general, one or more embodiments of a passive optical camera-based system are discussed.

Figure 1:
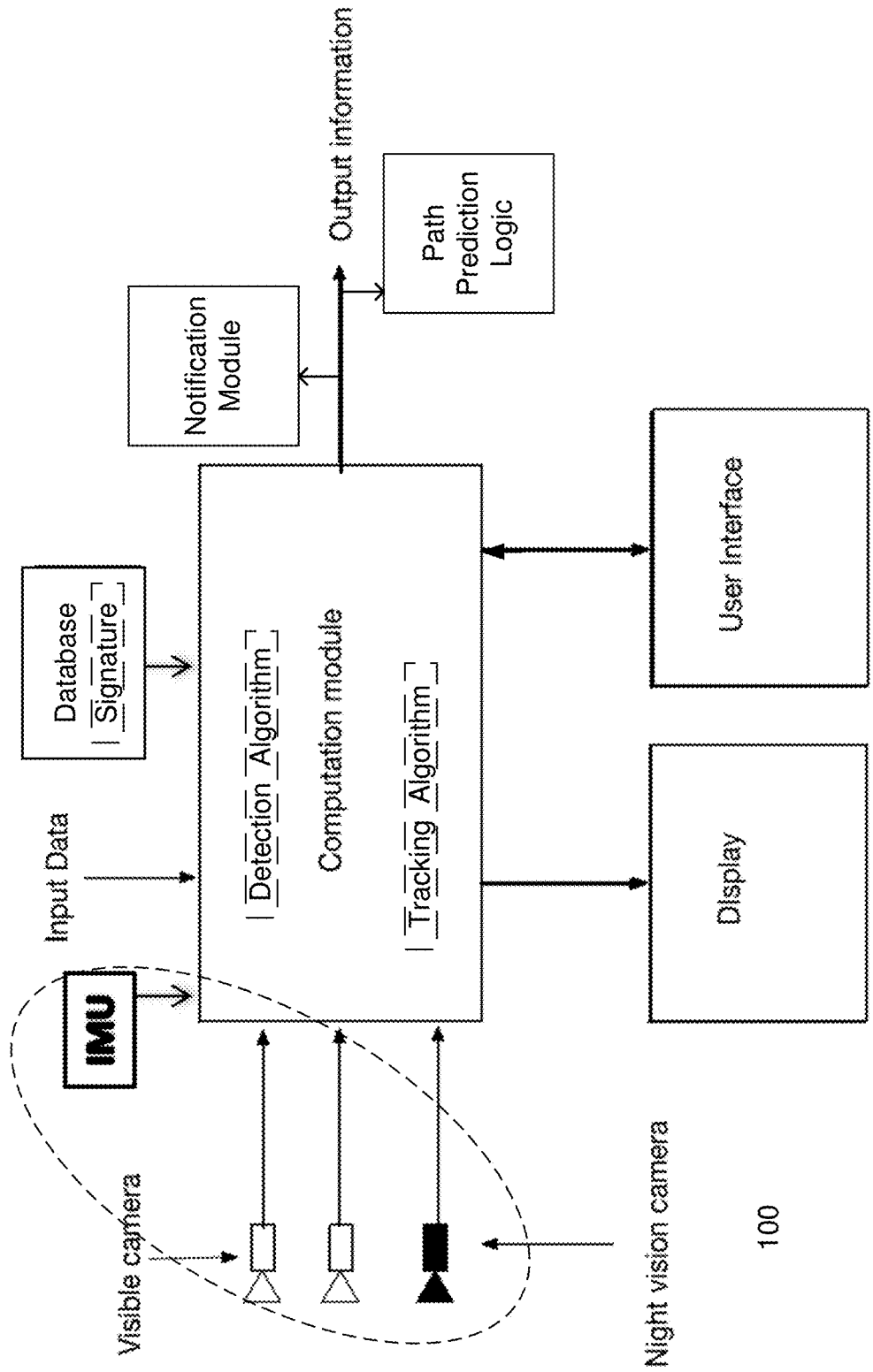
FIG. 1 illustrates a block diagram of an embodiment of a passive optical camera-based system configured to detect a presence of one or more vehicles with one or more cameras.

FIG. 1 illustrates a block diagram of an embodiment of a passive optical camera-based system configured to detect a presence of one or more vehicles with one or more cameras.

The passive optical camera-based system 100 may include multiple cameras, an inertial measurement unit, a database to store various information including vehicle signature information, a computation module that includes a memory and one or more processors to execute a detection algorithm, a tracking algorithm, a display screen, a user device interface, other input ports and output ports, path prediction logic, and many other similar components.

Figure 2:
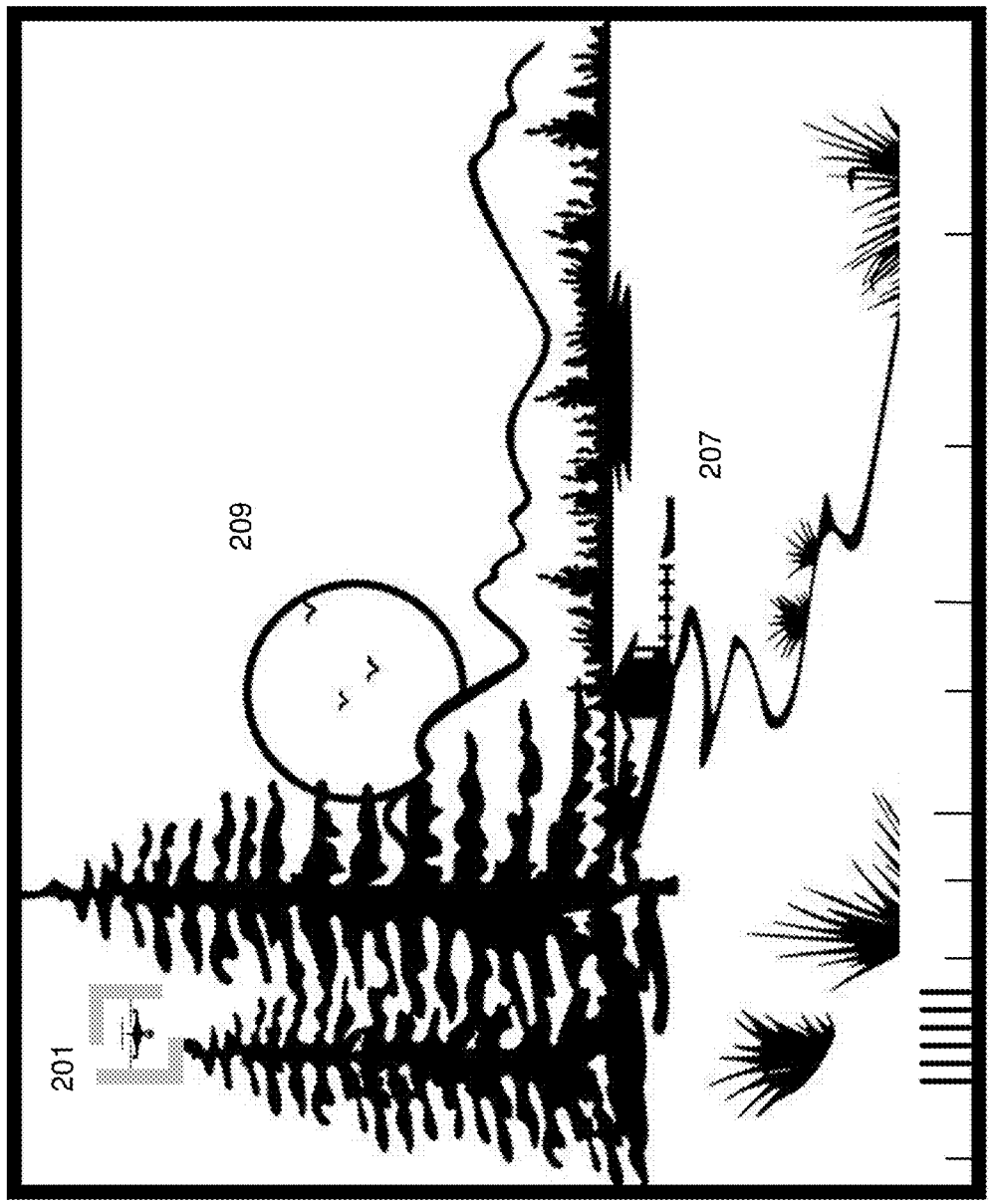
FIG. 2 illustrates an embodiment of a graphical user interface that displays detection results in real time on a display screen and generates a composite image where the detection results are overlaid on an image of the scene.

The passive optical camera-based system 100 detects a presence of one or more vehicles with one or more cameras. The vehicles may include rotor or propeller driven vehicles (e.g. hovercraft, airboats, airplanes, helicopters, vehicles, any ground vehicle with an external fan). The cameras collect the imaging data with their lenses and imagining sensors, such as a CMOS pixel image sensor. The computation module may control the system. The one or more processing units are responsible for processing the data. The algorithms may perform the actual detection and tracking of the vehicles. Thus, the passive optical camera-based system 100 may apply a detection algorithm to recognize the presence of the one or more vehicles using one or more imaging processors, such as FPGAs, GPUs, CPUs, etc., and the one or more cameras to detect minute fluctuations in light intensity from diffusely scattered light and/or reflections off of that vehicle. The detection algorithm in the computation module may identify and characterize the presence of the vehicles by directly measuring fluctuations in light intensity from the i) reflections off of and/or ii) scattering of light from a) the vehicle's rotor or b) other moving or vibrating parts of the vehicle. Thus, the detection algorithm finds pixels in each frame 1) with the fluctuations in light intensity greater than a noise band as well as 2) these pixels are grouped with connected pixels that also contain fluctuations in light intensity. Next, the detection algorithm classifies the connected grouping of pixels into a possible vehicle detection candidate. See, for example, FIG. 2 illustrating a graphical user interface that displays detection results in real time on a display screen and generates a composite image where the detection results are highlighted for the detected vehicles in an initial scene image on the display screen. See FIG. 3 for examples of a detection algorithm. Note, the detected light includes visible light as well as other types of light including Infrared (IR).

A display screen such as a monitor, heads up display on a helmet, digital glasses, smart phone, tablet, etc., presents the results in real time to the user or operator. The system 100 may display on a display screen the drone's location highlighted/indicated on the display screen in real time. In an embodiment, the displayed detection results is a generated composite image in the graphic user interface where the detection results are highlighted or otherwise indicated for detected vehicles, in the scene image. In an embodiment, i) black and white color is used for scene images and ii) a green highlighted color can be used for the overlay of a detected vehicle with sufficient statistical significance test scores and checked for persistence over time as a positive detection of a vehicle verses a false or erroneous frequency spike. In alternative embodiments, the detection results may be highlighted in other colors or emphasized in other ways.

The imaging detector sensors use fluctuations in light intensity to deliver early detection of the presence of a vehicle to a user or operator. See, for example, FIGS. 2, 5, and 6 detecting the fluctuations in light intensity from the vehicles. The system 100 passively detects small, readily available vehicles, such as quad copters, at ranges of up to or more than one kilometer, and can work on moving platform in rural and urban environments.

As discussed, the passive optical camera-based system 100 uses fluctuations in light intensity imaging and uses a high frame rate imager, such as 500 frames per second or more, and distinctive processing to detect the frequency content of modulated light in an image. The frequency information can be obtained by directly measuring the light modulation caused by surface vibrations or moving mechanical features (i.e., propellers, rotors, etc.). The system 100 builds a composite image combining the fluctuations in light intensity information and the initial (can be considered "raw" in some embodiments) image. The system 100 can spatially locate and separate frequency content of time-varying light sources; and therefore, enables the detection and measurement of the rotor frequency of the vehicle before the vehicle is identifiable by other imaging sensors with comparable resolution. This system 100 is thus able to differentiate small vehicles from birds, planes, and any other airborne objects.

In an embodiment, the system 100 includes one or more imaging sensors, a motorized pan/tilt mount, and a computer for data processing. The first step of the processing pipeline is to perform a PSD estimation (power spectral density) by computing real-time fast Fourier transforms (FFTs) along the time axis of the high speed camera image stream. In frequency space, spectral peaks are identified for each pixel and assigned statistical significance scores. The key frequencies for adjacent pixels are then combined into higher fidelity spectra that are grouped into detection events using spatial clustering. (See, for example, FIG. 2 at the bottom of the display, for an example of histogram 203 of assigned statistical significance scores for the scene where the histogram shows what is found vs. a threshold value.) The detection events are passed to a tracking algorithm that uses a Kalman filter or other tracking algorithm to accumulate the detections into object tracks. (See, for example, FIG. 4 for an example tracking algorithm.) The tracked vehicle coordinates can be sent to the display screen and the path prediction logic.

The path prediction logic will predict the motion in 3D of one or multiple drones and/or provide predicted coordinates to another system.

A notification module may receive notice of a vehicle detection event from the computation module. The notification module may push detection notifications over a network through a communications circuit to one or more electronic devices such as designated user's smartphones and/or computers.

The user device interface may allow the user to control actions for the system such as i) control localization data for a detection event on a display screen, ii) control an amount of zoom of a camera to focus on the vehicle detection candidate in the displayed scene on the display, iii) allow the user to request a live view of the vehicle detection candidate on the display screen of their device connected to the system via a network, iv) view an augmented reality overlay of a detection track for the vehicle detection candidate, and v) request that notifications be sent to other individuals. Note, the system may use a smartphone's IMU and camera view to create an augmented reality overlay of the detection track.

As discussed, the display of processed results shows the detection of a vehicle overlay on an image of the scene. A separate zoom lens can be co-aligned with each of the fixed lenses to allow added interrogation of interesting detections via the user device interface. Feature-based or change-based detection can be used to confirm a detection or allow for faster tracking of rapidly traveling vehicle across the field of view. Multiple vehicles may be outlined, each in its own box overlaid on the image of the scene, to identify the potential drone candidate displayed in real time to the user. See, for example, FIG. 2 for the outlined box around a vehicle 201. Note the vehicle of the rowboat 207 and the bird 209 are not highlighted due to lack of fluctuations in light intensity in the correct window of operation. The system can highlight a detected vehicle even when the amount of pixels that that vehicle occupies in the displayed screen makes it visually not possible to discern whether the object is indeed a vehicle verses a bird or other object but the fluctuations of light intensity and its persistence over time indicate a presence of a potential vehicle.

The database (DB) can store many different types of information. Some of the stored information is known characteristics of actual vehicles. The system may build a vehicle recognition signature and have a comparator to compare the possible vehicle detection candidate against the vehicle recognition signature to confirm the presence of the one or more vehicles. The known characteristics of actual vehicles fluctuations in light intensity information comes from, for example, the rotor frequency of the vehicle and/or movements. In alternative embodiments, the system may receive the known characteristics from another system or device.

The passive optical camera-based system 100 uses imaging processors to detect fluctuations in light intensity to identify the unique rotor frequency modulation from a vehicle at long range. This system 100 can be an entirely passive optical technique; and therefore, has no unwanted emissions (RF or otherwise) that could increase power consumption, provide information about possible defensive measures and locations of military forces, or require certification and/or FCC approval for commercial application. Additionally, the system 100 is unaffected by environments that have large amounts of acoustic or radio frequency noise.

The high-resolution optical technique enables precise pinpointing of the target elevation and azimuth and provides high-definition video imagery that highlights a detection in the context of the scene. With a motorized zoom lens, the system 100 can also dynamically zoom in on detection events to provide confirmation and a more detailed view of the target. Vehicles are distinguished from birds and planes by the frequency content of their rotor signal and since the system 100 provides temporal and spatial information in addition to an image of the detected device. Additional classification can be employed based on maneuver patterns and visual appearance as discussed for the signature comparison. If the target of interest is not a vehicle, the same classification strategies can be extended to select and detect larger drones, aircraft, rotorcraft, ground vehicles, machinery, and other sources with narrow-band signatures for fluctuations in light intensity.

Combining two or more cameras into a detector suite will enable triangulation and stereo vision techniques to be used to provide range and 3D tracking capabilities. (See, for example, FIGS. 5 and 6 for implementations with multiple cameras). Real time digital image stabilization will enable the sensors to be mounted on moving platforms to move with, for example, a squad of soldiers or provide a mobile protection unit in the case of civilian applications. (See, for example, FIG. 7 for a greater discussion on a real time digital image stabilization implementation.)

Ultimately, all of the processing can be incorporated on an embedded processor and camera system that is small enough in size and weight to be put on its own vehicle, vehicle, or even be man-portable.

Figure 3:
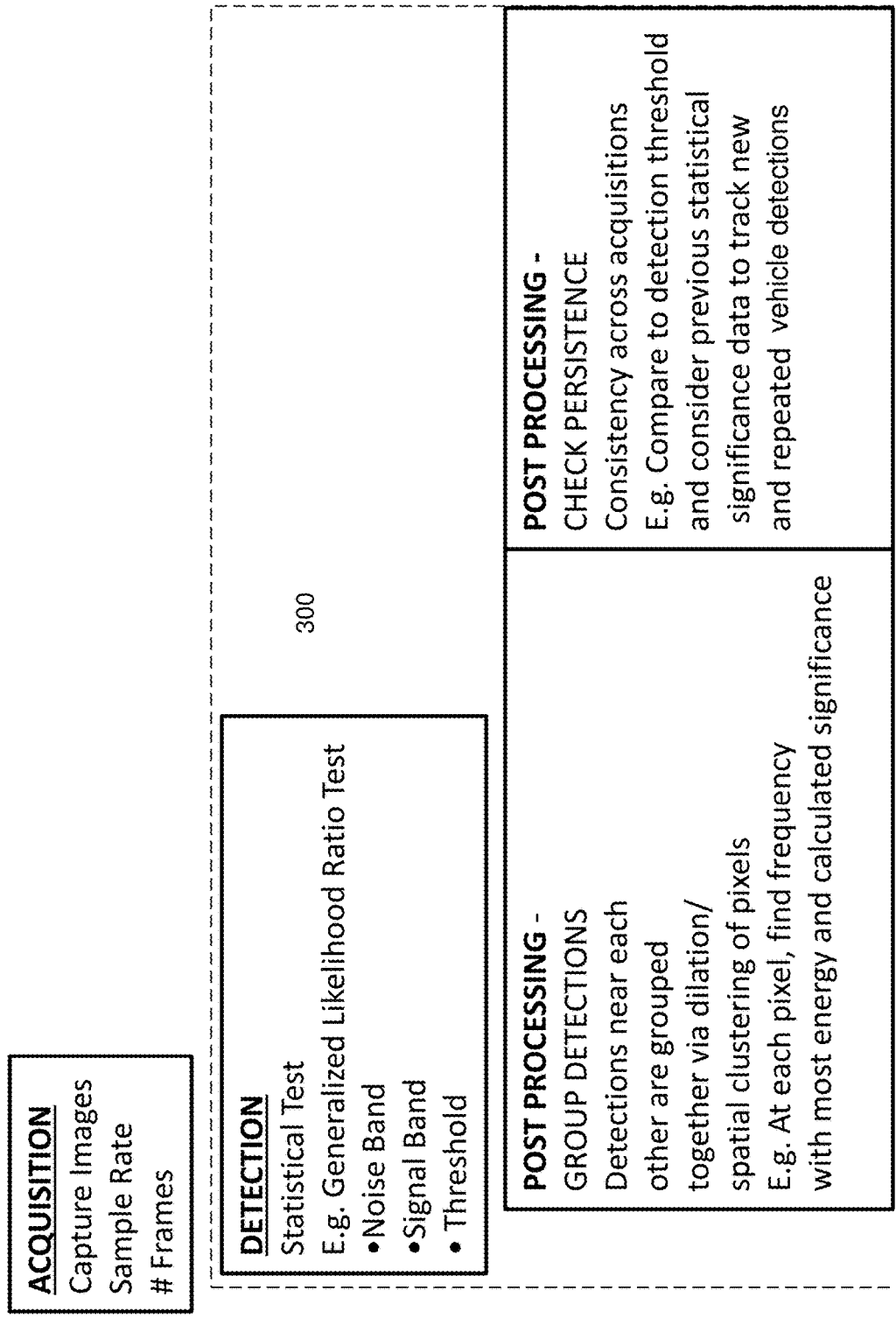
FIG. 3 illustrates a block diagram of an embodiment of the detection algorithm.

FIG. 3 illustrates a block diagram of an embodiment of the detection algorithm. The detection algorithm 300 acquires images, applies a statistical significance test to identify pixels in the images of possible significance, and then cooperates with a tracking algorithm to apply post processing to check for consistency across the candidate pixels of possible significance.

In an embodiment, the detection algorithm 300 may conduct a transform algorithm, such as a real-time fast Fourier transform (FFT), on the set of frames to convert fluctuations in light intensity over time to a frequency domain along a time axis of camera imagery captured by the one or more cameras in order to detect i) light fluctuations caused by rotors or propellers and/or ii) rotation or vibration of other parts of the vehicle. The transform algorithm performed on data from the camera imagery is combined with one or more processing techniques. The processing techniques include a) persistence tracking, b) binning, c) local histograms, and d) connected region clustering in order to improve specificity and detection range of a vehicle detection candidate in a scanned region of sky captured by the one or more cameras. The system may use a high-speed camera with a frame rate of, for example, greater than 500 frames per second and distinct processing to detect the frequency content of modulated light in an image. The frequency information is obtained by directly measuring the light modulation caused by surface vibrations or moving mechanical features (i.e., propellers, rotors, etc.)

The detection algorithm 300 may evaluate data from the set of frames read into a frame grabber. The detection algorithm 300 may then find the appropriate light fluctuations captured in the images by performing a statistical significance test, such as a Generalized Likelihood Ratio Test (GLRT), containing a transform algorithm, such as a FFT, on the set of frames, i) to transform fluctuations in light intensity over time to find a frequency with the most energy for each pixel, ii) apply a minimum threshold for candidate pixels set at greater than in a noise band, iii) calculate significance in frequency space, iv) identify spectral peaks for each pixel, v) assign statistical significance scores to each candidate pixel, and then vi) correlate key frequencies for adjacent pixels, which are then combined into higher fidelity spectra which are grouped into detection events using spatial clustering.

In an embodiment, the statistical significance test is a GLRT performed on a most recent set of frames from the imager, such as 256 frames, 512 frames, etc., stored in the frame buffer. The statistical significance test performs a fast Fourier transform algorithm on groups of consecutive frames in the most recent set of frames. The detection algorithm 300 then spatially groups (e.g. bins) the Fourier transform result. Additional statistical significance test may be applied such as the Locally Most Powerful Test (LMPT), Uniformly Most Powerful Test, Simple Statistical Significance, or the optimal tonal detectors algorithm.

Variants of the GLRT test may be employed.

Acquisition

The detection algorithm 300 acquires captured images at a high enough sample rate and total amount of frames to detect fluctuations in light intensity from scattered light and/or reflections off of a vehicle. The detection algorithm 300 may capture a stream of raw imagery into a GPU's memory. New frames are written at, for example, 1024 Frames Per Second. The Frame rate may at least be twice the highest expected frequency is desired for high signal to noise ratio. A background thread may continuously copy camera frames from the frame grabber to CPU's memory and then from the CPU's memory to the GPU's memory.

Detection

The detection algorithm 300 performs a statistical significance test that sets a candidate pixel threshold above the noise band and then assigns a score to each such candidate pixel based in part on the signal strength in an expected possible frequency band of operation of a vehicle.

A GPU or any other processor continually computes a statistical significance test, such as a GLRT, on the most recent set of frames, 256 frames, 512 frames, in memory for a hardware limited update rate of ~20 fps. In alternative embodiments, the hardware limitation will change over time as hardware technology is updated. The detection algorithm 300 performs a Fourier transform on groups of consecutive frames, such as the most recent 256 or 512 images, (¼ second or ½ second), from the camera. The detection algorithm 300 spatially groups (e.g. bins) the Fourier transform result. For example, 2 (horizontal)×1 (vertical) binning can be used for a higher Signal to Noise Ratio at the expense of horizontal resolution.

The detection algorithm 300 calculates scores for the Generalized Likelihood Ratio Test and their corresponding frequencies at each pixel location. An example GLRT is sum(X)/(sum(X)−max(X)) where X is the 256-element vector of squared FFT magnitudes for a given pixel. Note that FFT magnitudes at frequencies outside of the noise and signal band are omitted from the calculation of sum(X) and max(X) respectively. Note, also that the FFT magnitudes can be scaled with a 1/F function to compensate for different noise floors at different frequencies.

Thus, the detection algorithm 300 determines whether that the frequency is a statistically significant amount over a threshold amount of frequency in order to observe something more significant than background noise. The detection algorithm 300 may also filter to eliminate common items with repeated frequencies and patterns, such as light bulbs with known frequency, such as the common 120 Hz harmonic from rectified 60 Hz AC power from the grid. These frequencies can trivially be filtered in the frequency domain by zero-ing the amplitude. The detection algorithm 300 assigns a score to each pixel with frequencies that is a statistically significant amount over the threshold and filters/removes any known light oscillating sources in the frequency band of analysis, such as light bulbs operating at the electric grid frequency. See, for example, FIG. 2 at the bottom of the display for an example of a bar graph 203 of assigned statistical significance scores for the scene and a higher magnitude of significant scores corresponding to the vehicle pixels in the captured frames.

Post-Processing

The detection algorithm 300 groups pixel detections near each other together. The key frequencies for adjacent pixels are then combined into higher fidelity spectra which are grouped into detection events using spatial clustering. The detection events are passed to a tracking algorithm to check for persistence consistency. The detection algorithm 300 checks for persistence consistency for candidate pixels with high scores across acquisitions. The detection algorithm 300 compares the scores to the detection threshold and considers previous GLRT data to track new and repeated vehicle detections. The detection algorithm 300 correlates key frequencies for adjacent pixels. The detection algorithm 300 checks persistence consistency across acquisitions of sets of frames in time. For example, the algorithm considers previous statistical significance data to the new and repeated vehicle detections, which in some embodiments the detection algorithm 300 may receive this information from the tracking algorithm.

Figure 4:
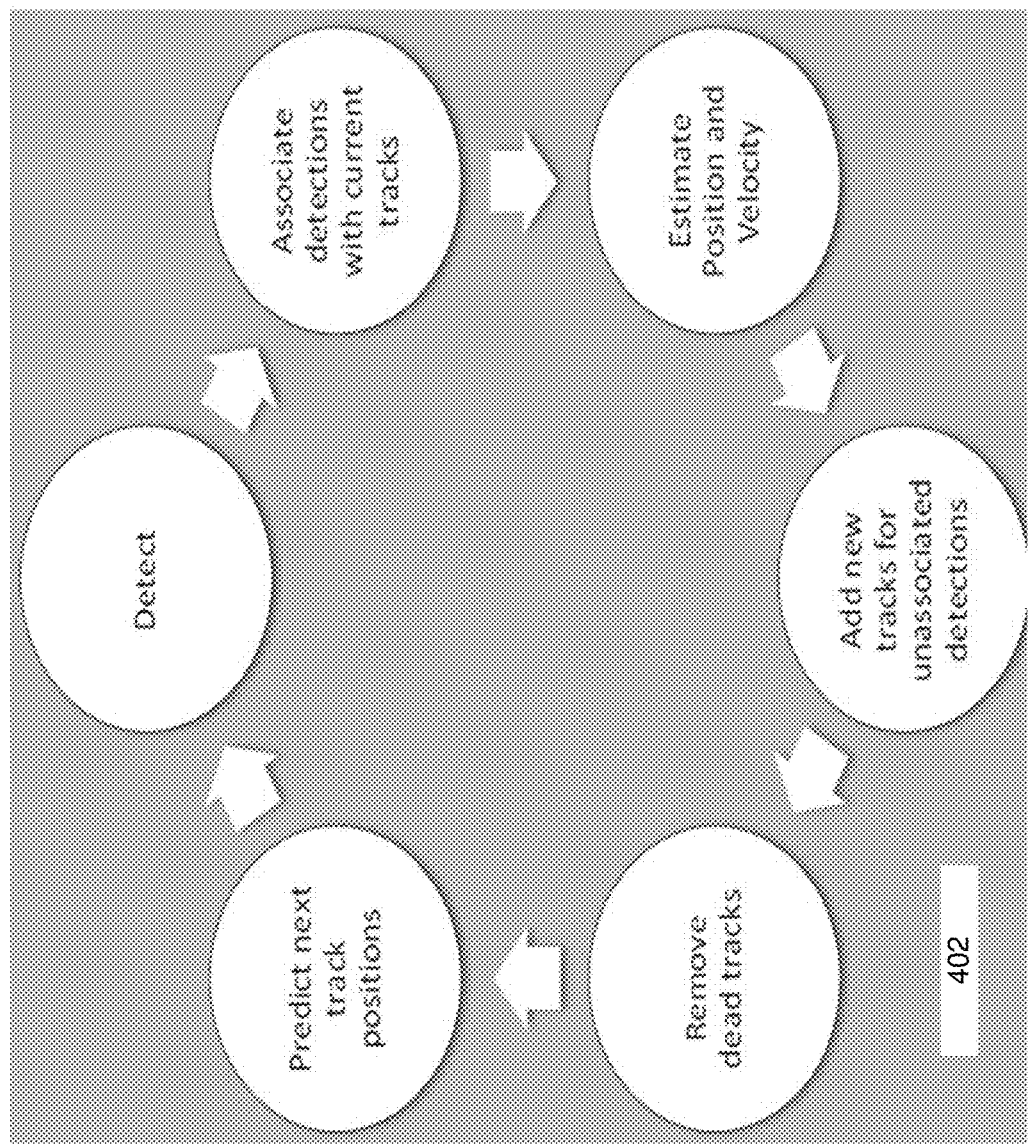
FIG. 4 illustrates a block diagram of an embodiment of a tracking algorithm.

FIG. 4 illustrates a block diagram of an embodiment of a tracking algorithm.

The detection events are passed to a tracking algorithm 402, which, for example, uses a Kalman filter, to accumulate over time the detection events into object tracks that are tracked overtime in order to consider data from a previous statistical significance test compared to tracked new and repeated detection events from a current statistical significance test. The correspondence between the previous tracked object tracks to the new tracked object tracks over time increases the Kalman filter's confidence score in recognizing a vehicle detection candidate as an actual vehicle that is present in the scene. Thus, the algorithm aggregates detection candidates to track objects over time in order to consider previous GLRT data compared to tracked new and repeated vehicle detections and through this correspondence over time increase the Kalman filter's confidence. When a confidence threshold is passed, the vehicle on its object track is reported to a user via any of i) a generated notification sent to an external device from the system and ii) a display on a display screen of the passive optical camera-based system.

In an embodiment, the tracking algorithm 402 may record previous positions of a tracked vehicle with sufficient GLRT scores. The tracking algorithm 402 may associate detections that are grouped to a nearest tracked position. Some detections are left unassociated if they are too far. The tracking algorithm 402 may update position and velocity estimates. Position and velocity estimates of each track are updated according to their detected positions (via e.g. the Kalman filter). If a track has not been associated with any detections, the tracking algorithm 402 keeps the tracked position and velocity; and then, initializes a new track for the unassociated detection.

The tracking algorithm 402 may remove any tracks that have not been associated with detections for several frames. The tracking algorithm 402 may also predict the next track positions.

In an embodiment, the detection algorithm may receive feedback from the tracking algorithm 402. The detection algorithm may calculate a spectrum of Generalized Likelihood Ratio Test scores as a function of frequency for larger pixel regions (for example, binned 4×2 pixel regions, depending on resolution and ranges of interest needed) to increase the Signal to Noise Ratio and recover light intensity fluctuation energy that gets spread over multiple pixels from moving targets. The algorithm may then copy arrays from the earlier steps to the CPU's memory for detection and tracking processing within the processing unit. The GPU (or other processing unit, such as a field programmable gate array) immediately returns to the detection steps of computing FFTs and the statistical significance test on the next chunk of image data in the background. Again, a cluster of high GLRT pixel regions are identified as possible detection events using the connected algorithms. The detection events are fed to a Kalman filter, where they either spawn a new track or are added to an existing track. The algorithm overlay tracks with a confidence above the confidence threshold on the raw imagery in the graphic user interface. A track typically passes the confidence threshold required to be registered as a full detection after it has persisted for at least 0.1 second with more than 50% of GLRT update frames contributing a new detection even to the track. The algorithm then draws a GLRT composite image on GUI screen with annotated tracked detections. The algorithm waits for the GPU to signal completion of the next GLRT calculation and then updates the GUI again.

The tracking algorithm 402 may build 3D object tracks. In an embodiment, the tracking algorithm 402 may build 3D object tracks in azimuth and elevation using camera orientation. The tracking algorithm 402 may annotate the tracks with frequency, heading, speed, and snapshot images of the detected object and send this to the GUI.

In an embodiment, a GUI implements a simple detection and tracking algorithm on GLRT data passed from the GPU and overlays detection results onto the initial scene imagery. The GUI generates a composite image on the display. Black and white colors are used for the scene image and a green or yellow color is used for the overlaid highlighting of pixels with sufficient GLRT scores that are consistent over time.

Note, algorithms herein may be implemented in software by itself, hardware Boolean logic by itself, or some combination of both. Any portions of an algorithm implemented in software can be stored in an executable format in portion of a memory and is executed by one or more processors.

In an embodiment, the graphical user interface may implement a recognition algorithm that is configured to display detection results in real time on a display screen. The composite image is generated in the graphical user interface. The detection results are highlighted or otherwise indicated for detected vehicles in a raw scene image on the display screen. (See FIG. 2 for example). The recognition algorithm for the graphical user interface determines one or more detected vehicles on data results from the detection algorithm using a statistical significance test on the scattered light and/or reflections i) that generated a sufficient score above a set threshold and ii) that were also checked for persistence over time as a positive detection of an vehicle verses a single false or erroneous frequency spike.

FIG. 5 illustrates a block diagram of an embodiment of two or more cameras that are mounted in the system so that each camera is configured to scan a designated region of the sky to maximize coverage, and when directed by a tracking algorithm and/or detection algorithm, then dwell on a potential detected vehicle and coordinate multiple cameras to converge on the potential detected vehicle to get stereo data for determining range to the vehicle detection candidate. A first camera 506 may scan a first region in the sky and a second camera 508 may scan images of a second separate region of the sky or other areas. A vehicle 501 may be detected via the scattered light and/or reflections captured in images contained in a set of frames from the first camera 506, which are processed by the detection algorithm and imaging processors. The tracking algorithm and/or detection algorithm then may ask the first camera 506 to stop scanning and temporary dwell on the specific area where the potential detected vehicle 501 was detected. The algorithm then may ask the second camera 508 to stop scanning and converge on the potential detected vehicle to get stereo data for determining range to the vehicle detection candidate 501. The detection algorithm may get stereo data, either with stereo vision and/or triangulation, for determining range to the vehicle detection candidate 501. Thus, the algorithm dwells on the potential detected vehicle long enough to interrupt sweeps/scans of the two cameras upon request to converge and check on the detected object. In general, both cameras can scan independently, but when a vehicle is detected in frames from one camera, then the second camera can be asked to look in same direction to do triangulation or stereo calculation of range. After obtaining the stereo data, the independent scanning will resume. The tracking algorithm is further configured to plot and store 3D trajectories of the vehicle detection candidate.

Note, a lack of active emissions from the passive optical camera-based system allows the detection algorithm and imaging processors to detect the presence of the one or more vehicles without giving away a presence of the passive optical camera-based system.

FIG. 6 illustrates a block diagram of an embodiment two more cameras that are networked together and used in concert to provide coverage of larger areas of terrain. Each camera 606, 608, 610 is configured to simultaneously scan designated regions of the sky to reduce a time needed to provide full and constant coverage of the sky. When at least two of the cameras 606, 608, 610 are synchronized in time and space, then they may be used to calculate range to a detected vehicle. Each camera node 606, 608, 610 in the network can be coded to collect and perform local processing of the set of frames captured by that camera to detect a frequency content of modulated light from the scattered light and/or reflections off of a potential vehicle captured in the image frames. The local computing captures the data from these images prior to sending this data to a master computer for coalescing data with data from all of the nodes in the network. Thus, individual sensor/tablet sets can collect all data from all sensors locally and do necessary processing. Then, the data can be sent over the network to a main computer for storage and coordinating. The system coordinates scan patterns and ranging on detected objects via the networked sensors. The sensors can be placed in fixed locations, or they can be attached to vehicles that move at typically walking speeds. The various sensors may be linked together in a wireless network. Triangulation of multiple sensors may be used for calculating range.

Note, regarding the detection algorithm, a drone may only fly so fast so a pixel fluctuating in light intensity half way across the frame would not be considered an adjacent pixel for the detection algorithm. In FIG. 6, the first drone's pixels 601 would not be associated with the second drone's pixels 607. The tracking used checks for consistency along detection intervals. The tracking algorithm estimates the relative motion of a detected target between subsequent processing intervals. Note this can mean that the target is stationary or moving. If, in a subsequent processing interval, a target is detected outside of a previously detected target's predicted area, it is considered a new, separate target. In FIG. 6, if the first drone was stationary, the appearance of the second drone would not correlate to the first drone, because it would be outside the expected region of the first drone.

A database containing characteristic information for system may be part of the system. The system may include a database containing descriptors for device classification. Possible descriptors include fluctuation frequency, fluctuation intensity, fluctuation spatial pattern (i.e. number of rotors and rotor spacing), flight behavior, and appearance. Appearance-based descriptors could be collected using a zoom lens to collect close-up imagery of the target once a fluctuation signature has been observed. These descriptors could be used to classify the size and brand of a UAV as well as whether it is carrying a payload. Furthermore, they can improve the specificity of detection versus possible confusing objects such as birds or flashing lights. The system builds the vehicle recognition signature consisting of a composite image that combines i) information on the fluctuations in light intensity for the vehicle detection candidate versus known characteristics of actual vehicles. To increase accuracy the vehicle recognition signature verifying a presence of a vehicle in a scene verses a bird, flashing light, etc., the known possible fluctuations in light intensity corresponding to a vehicle may be coupled with one or more of ii) a visual appearance of the vehicle in the initial image, and iii) a flight maneuver pattern of the vehicle tracked over the set of frames. These two or more factors allow recognition of a vehicle even when the vehicle is not readily visibly discernable against background object captured in the set of frames.

The system may include path prediction logic. The path prediction logic may predict a motion in 3D of one or multiple vehicles. The coordinates of a detected vehicle are passed to the path prediction logic that will predict the motion in 3D of the one or more vehicles. The system may at least i) provide predicted coordinates to another system and/or ii) provide, on a display screen, the vehicle's location highlighted on the display screen in real time. In real time, this may be less than one second. Predicted target displacement can vary from a minimum of approximately zero, as would be the case for a stationary object, to a maximum determined by the velocity of the target multiplied by the time elapsed between frames. The shared prediction coordinates between multiple sensors are used for calculating range and developing the 3D situational awareness of number and location of vehicles of interest in the scene.

Note, various configurations of the system can include:
one camera mounted to a fixed platform, one camera mounted to a moving platform, multiple cameras and at least one mounted to a moving platform, multiple cameras that are each mounted to their own moving platform, and multiple cameras that are each mounted to their own fixed platform.

FIG. 7 illustrates a block diagram of an embodiment of a passive optical camera-based system with a real-time digital image stabilization program that i) combines data from an inertial measurement unit that measures a motion of a first camera and ii) then generates motion compensation data to correct data captured in the set of frames. The passive optical camera-based system 700 may contain an inertial measurement unit (IMU) to supply IMU data to the Image Stabilizer, and a camera imager to supply image data to the Image Stabilizer. The Image Stabilizer performs its function and then sends its motion compensated data for a spectral processing by the detection algorithm. The detection algorithm and tracking algorithm can combine to send the imagery data, vehicle detection location(s), and other information including signal frequency and strength to the user display.

In an embodiment, a software-based real-time digital image stabilization program may i) combine data from an inertial measurement unit that measures a motion of a camera and ii) then generate motion compensation data to correct data captured in the set of frames in real time before image processing by the imaging processors. The inertial measurement unit may track camera pointing direction. The digital image stabilization program and the inertial measurement unit may enable the one or more cameras mounted on one or more moving platforms to prevent a motion of the cameras from interfering with the detection algorithm. The IMU compensated data for a moving platform ensures detection events can be accurately localized in global coordinates and improves SNR by reducing the spreading out of fluctuation features from motion. Note, a mechanical-based real time digital image stabilization could also be used in some embodiments. The cameras can be mounted on a vehicle, e.g. car or Unmanned Ground Vehicle (UMG) to travel along with a moving team worried about drone activity.

Note, one or more cameras may be a high speed camera with a frame rate of greater than 500 frames per second. The frames are read into a frame grabber so that a first vehicle with a rotor frequency of 250 hertz or less can be readily detected by the detection algorithm. The system uses a high-speed camera interface, such as CoaXPress, to convey data from the camera to the frame buffer. The frame buffer stores captured raw camera pixel data into this circular buffer for continuous processing by a first processor. A background thread continuously copies camera frames from the frame grabber to CPU's memory for processing and then from CPU's memory to GPU's memory for processing.

A need exists for the passive optical camera-based system 700. Small unmanned air vehicles (vehicles), or drones, are becoming commonplace, are readily available commercially, and pose threats to both military and commercial targets. These vehicles are difficult to detect, are equipped with cameras for real-time transmission of video surveillance to the operator, and can easily transport and deliver explosives or other materials. They are also posing a threat to individual privacy, with more and more complaints about unwanted drones flying into people's yards with high resolution video cameras. The passive optical technology is capable of providing a surveillance tool for detecting drones flying in the vicinity of any region needing to be protected from them. The system is also capable of detecting a variety of vehicles with an optical-based vehicle signature, including larger aircraft, trucks, etc.

Vehicles could be used by terrorists and other groups to remotely surveille or deliver improvised explosive devices or other materials. There is a growing need to detect small vehicles as they approach specific targets before they are close enough to cause disruption or harm. Targets such as the military, stadiums, large public gatherings, airports, etc. require the capability to detect vehicles and then decide on a course of action. If detected early enough, the vehicle could be disabled out of range of harm to the intended targets. The system can demonstrate detection of vehicles at ranges of 1 kilometers and more. As small vehicles become more common, the need for a reliable detection technique will increase. The commercial applications can range from individuals interested in protecting privacy to large commercial operations concerned about industrial espionage to sporting events concerned about public safety.

Multiple sensors can be used to obtained more coverage of the sky, reducing the time needed to provide full and constant coverage. Also, sensors can be used in concert to provide coverage of larger areas of terrain, and if synchronized in time and space can be used to calculate range. The sensors can be placed in fixed locations, or they can be attached to mobile platforms. The real-time digital image stabilization prevents motion of the sensors interfering with the detection algorithms. By using embedded processing, the sensors can be made small enough to be human portable, so that a squad of soldiers, for example, or a first responder team in an emergency can all be connected and mutually aware of what others in the network are seeing.

Such a network of sensors could then be used in a mobile ad-hoc network. Such a system can be rapidly deployed in an emergency and situation awareness can be provided where network infrastructure does not already normally exist, or has been taken out by some event. The data could be shared as azimuth, elevation and range data or integrated smart device mapping applications, such as the Android Tactical Assault Kit (ATAK), Google maps, or other mapping application for sharing data.

FIG. 2 illustrates an embodiment of a graphical user interface that displays detection results in real time on a display screen 291 and generates a composite image where the detection results are highlighted for the detected vehicles 201 in an initial scene image on the display screen 291. The vehicle 201 is highlighted. The corresponding statistical scores are shown on a bar graph 203 at the bottom of the screen. The scene shows the trees, birds, house, lake, and the vehicle.

Note, the one or more cameras may cooperate with i) a high speed sensor, ii) an infrared sensor, or iii) both to allow the system to be used for night vision and low light applications to recognize of the presence of the one or more vehicles. Thus, the high-speed sensors and/or infrared sensors could be used for night vision and low light applications to obtain the fluctuations of light intensity.

In an embodiment, passive optical camera-based system with the detection algorithm enhances conventional change detection or object recognition based detection schemes by identifying potential targets and then employing the fluctuation-based detection strategies to improve the confidence of detection and identification. By only applying fluctuation detection to regions in the scene identified as objects of interest, the camera capability and processing power required to achieve satisfactory detection coverage can be reduced. Additionally, by identifying fast moving objects and then shifting and aligning the part of each camera frame corresponding to the object of interest, the SNR of the fluctuation detection algorithms can be substantially improved.

FIGS. 8A-8B illustrate flow diagrams of an embodiment of a passive optical camera-based system detecting vehicles. Note, the following steps may be performed in any order where logically possible.

In step 802, the passive optical camera-based system detects a presence of one or more vehicles with one or more cameras in the passive optical camera-based system.

In step 804, the passive optical camera-based system applies a detection algorithm to recognize of the presence of the one or more vehicles using one or more imaging processors and the one or more cameras to detect fluctuations in light intensity from scattered light and/or reflections off of that vehicle. Those scattered light and/or reflections are captured in images contained in a set of frames from the one or more cameras.

In step 806, the passive optical camera-based system uses the detection algorithm to evaluate data from the set of frames read into a frame grabber.

In step 808, the passive optical camera-based system uses the detection algorithm to find the scattered light and/or reflections captured in the images by performing a statistical significance test containing a transform algorithm on the set of frames, i) to transform fluctuations in light intensity over time to find one or more frequencies with the most energy for each pixel, ii) apply a minimum threshold for candidate pixels set at greater than a noise band, iii) calculate the statistical significance of prominent peaks in frequency space, iv) aggregate results for adjacent pixels, v) assigned statistical significance scores to each candidate pixel, vi) correlate key frequencies for adjacent pixels and vii) track those detection events over time.

In step 810, the passive optical camera-based system determines one or more detected vehicles on data results from the detection algorithm using a statistical significance test on the scattered light and/or reflections i) that generated a sufficient score above a set threshold and ii) that were also checked for persistence over time as a positive detection of an vehicle verses a single erroneous frequency spike.

In step 812, the passive optical camera-based system uses a graphical user interface to display detection results in real time on the display screen. A composite image is generated in the graphical user interface and the detection results are a highlighted outline around a detected vehicle in a scene image on the display screen.

In step 814, the passive optical camera-based system uses two or more cameras mounted in the system so that each camera is configured to scan designated regions of the sky to enhance coverage. The system interrupts a scan of at least two cameras and dwells on a potential detected vehicle and coordinates the at least two cameras to converge on the potential detected vehicle to get stereo data, either stereo vision and/or triangulation, for determining range to the vehicle detection candidate.

In step 816, the passive optical camera-based system plots and stores 3D trajectories of the vehicle detection candidate.

In step 818, the passive optical camera-based system uses path prediction logic to predict a motion in 3D of one or multiple vehicles. The coordinates of a detected vehicle are passed to the path prediction logic that will predict the motion in 3D of one or more vehicles and at least one of i) provide predicted coordinates to another system and ii) provide, on a display screen, the vehicle's location highlighted on the display screen in real time.

FIG. 9 illustrates an embodiment of one or more computing devices 900 that can be a part of the passive optical camera-based system. The computing device may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of the passive optical camera-based system implemented in software 944, 945, 946 are stored in the one or more memories 930-932 and are executed by the one or more processors 920.

Components of the computing system 900 may include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus, an interconnect fabric, a peripheral bus, and a local bus using any of a variety of bus architectures.

Computing system 900 typically includes a variety of computing machine-readable media. Computing machine-readable media can be any available media that can be accessed by computing system 900 and includes both volatile and nonvolatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system memory 930 includes computer storage media in the form of volatile and/or nonvolatile memory such as read only memory (ROM) 931 and random access memory (RAM) 932. A basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, FIG. 9 illustrates a solid-state memory 941. Other removable/non-removable, volatile/nonvolatile computer storage media that can be used in the example operating environment include, but are not limited to, USB drives and devices, flash memory cards, solid state RAM, solid state ROM, and the like. The solid-state memory 941 is typically connected to the system bus 921 through a non-removable memory interface such as interface 940, and USB drive 951 is typically connected to the system bus 921 by a removable memory interface, such as interface 950.

The drives and their associated computer storage media discussed above and illustrated in FIG. 9, provide storage of computer readable instructions, data structures, other executable software, and other data for the computing system 900. In FIG. 9, for example, the solid-state memory 941 is illustrated for storing operating system 944, application programs 945, other executable software 946, and program data 947. Note that these components can either be the same as or different from operating system 934, application programs 935, other executable software 936, and program data 937. Operating system 944, application programs 945, other executable software 946, and program data 947 are given different numbers here to illustrate that, at a minimum, they are different copies.

A user may enter commands and information into the computing system 900 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections depicted in FIG. 9 can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resident on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, FIG. 9 illustrates remote application programs 985 as residing on remote computing device 980. It will be appreciated that the network connections shown are examples and other means of establishing a communications link between the computing devices that may be used.

As discussed, the computing system 900 can include a processing unit 920, a memory (e.g., ROM 931, RAM 932, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 9. However, the present design can be carried out on a server, a computing device devoted to message handling, or on a distributed system in which different portions of the present design are carried out on different parts of the distributed computing system.

Another device that may be coupled to bus 921 is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A system, comprising:
   a passive optical camera-based system configured to detect a presence of one or more vehicles with one or more cameras, where the passive optical camera-based system is configured to apply a detection algorithm to recognize the presence of the one or more vehicles using one or more imaging processors and the one or more cameras to detect fluctuations in light intensity from scattered light and/or reflections off of that vehicle, where those scattered light and/or reflections are captured in images contained in a set of frames from the one or more cameras, which are processed by the detection algorithm and imaging processors, where any portions of the detection algorithm implemented in software is stored in an executable format in a memory and is executed by one or more processors, where the detection algorithm is configured to evaluate data from the set of frames, the detection algorithm is configured to find the scattered light and/or reflections captured in the images by performing a statistical significance test on the set of frames by a transform algorithm to transform i) fluctuations in light intensity over time to find a frequency with the most energy for each pixel, ii) apply a minimum threshold for candidate pixels set at greater than a noise band, iii) calculate significance in frequency space, and iv) assign statistical significance scores to each candidate pixel.

2. The system of claim 1, where the detection algorithm is configured to identify and characterize the presence of the vehicles by directly measuring fluctuations in light intensity from the i) reflections off of; ii) emissions from, iii) blocking of background light by and/or iv) scattering of light from, a) the vehicle's rotor or b) other moving or vibrating parts of the vehicle; and thus, the detection algorithm is configured to find pixels in each frame 1) with the fluctuations in light intensity greater than a noise band as well as 2) these pixels are part of group of connected two or more pixels with these fluctuations in light intensity greater than the noise band, and then the detection algorithm is configured to classify the connected grouping of pixels into a possible vehicle detection candidate, where the system is configured to build an vehicle recognition signature and have a comparator to compare the possible vehicle detection candidate against the vehicle recognition signature to confirm the presence of the one or more vehicles.

3. The system of claim 2, where the system builds the vehicle recognition signature consisting of a composite image that combines i) information on the fluctuations in light intensity for the vehicle detection candidate versus known characteristics of actual vehicles, and one or more of ii) a visual appearance of the vehicle in an initial image, and iii) a movement pattern of the vehicle tracked over the set of frames, which allows recognition of the one or more vehicles even when they are not readily visibly discernable against one or more background objects captured in the set of frames.

4. The system of claim 1, where the detection algorithm is configured to conduct the transform algorithm on the set of frames to convert fluctuations in light intensity to spectrum over time of camera imagery captured by the one or more cameras in order to detect i) rotor light intensity fluctuations and/or ii) rotation or vibration of other parts of the vehicle, where the transform algorithm performed on data from the camera imagery is combined with processing techniques including one or more selected from a group consisting of a) persistence tracking, b) binning, c) local histograms, and d) connected region clustering in order to improve specificity and detection range of an vehicle detection candidate in a scanned region captured by the one or more cameras.

5. The system of claim 1, further comprising:
software-based real-time digital image stabilization application that i) combines data from an inertial measurement unit that measures a motion of a first camera and ii) then generates motion compensation data to correct data captured in the set of frames in real time before image processing, where the inertial measurement unit is configured to track camera pointing direction, where the digital image stabilization application and the inertial measurement unit are configured to enable the one or more cameras mounted on a moving or vibrating platform to prevent a motion of the cameras from interfering with the detection algorithm.

6. The system of claim 1, where the detection events are passed to the tracking algorithm to accumulate over time the detection events into object tracks that are tracked over time in order to consider data from a previous statistical significance test compared to tracked new and repeated detection events from a current statistical significance test, where through this correspondence between previous tracked object tracks to new tracked object tracks over time increases a confidence score in recognizing an vehicle detection candidate as a present vehicle, and when a confidence threshold is passed, where a lack of active emissions from the passive optical camera-based system allows the detection algorithm and imaging processors to detect the presence of the one or more vehicles without giving away the presence of the passive optical camera-based system.

7. The system of claim 1, where the presence of an vehicle on its object track is reported to a user via any of i) a generated notification sent to an external device from the system and ii) a display on a display screen.

8. The system of claim 1, further comprising:
a user interface that implements a recognition algorithm that is configured to display detection results in real time on a display screen, where a composite image is generated in the graphical user interface, where the detection results are highlighted or otherwise indicated for detected vehicles in an initial scene image on the display screen, where the recognition algorithm for the graphical user interface determines one or more detected vehicles on data results from the detection algorithm using the statistical significance test on the scattered light and/or reflections i) that generated a sufficient score above a set threshold and ii) that were also checked for persistence over time as a positive detection of an vehicle verses a single erroneous frequency spike.

9. The system of claim 1, further comprising:
path prediction logic that is configured to predict a motion in 3D of one or multiple vehicles, where coordinates of a detected vehicle are passed to the path prediction logic that will predict the motion in 3D of the one or more vehicles and at least one of i) provide predicted coordinates to another system and ii) provide, on a display screen, the vehicle's location shown on the display screen in real time.

10. The system of claim 6, where the tracking algorithm is configured to build 3D object tracks in absolute coordinates by compensating for camera orientation and lens distortion.

11. The system of claim 1, where two or more cameras are mounted in the system so that each camera is configured to scan designated regions to enhance coverage, and where directed by the tracking algorithm then dwell on a potential detected vehicle and coordinate multiple cameras to converge on the potential detected vehicle to get stereo data, either stereo vision and/or triangulation, for determining range of the vehicle, where the tracking algorithm is further configured to plot and store 3D trajectories of the vehicle.

12. The system of claim 1, where the one or more cameras are configured to cooperate with i) a high sensitivity sensor, ii) an infrared sensor, or iii) both to allow the system to be used for night vision and low light applications to detect and track of the presence of the one or more vehicles.

13. The system of claim 1, further comprising:
a notification module that is configured to receive notice of an vehicle detection event, where the notification module is configured to send detection notifications over a network through a communications circuit to one or more electronic devices; and
a user device interface that is configured to allow a user to control actions for the system selected from a group consisting of i) control localization data for a detection event on a display screen, ii) control an amount of zoom of a first camera on an vehicle detection candidate, iii) allow the user to request a live view of the vehicle detection candidate on the display screen of their device connected to the system via a network, and iv) view an augmented reality overlay of a detection track for the vehicle detection candidate.

14. The system of claim 1, where two or more cameras are mounted in the system so that each camera is configured to simultaneously scan designated regions of the sky to reduce a time needed to provide constant coverage, where the two more cameras are networked together and used in concert to provide coverage of larger areas of terrain, and when at least two of the cameras are synchronized in time and space, then they are used to calculate range of a detected vehicle, where each camera acts as a node in the network, where each node is coded to collect and perform local processing of the set of frames to detect a frequency content of modulated light from the scattered light and/or reflections off of the vehicle prior to sending this data to a computer for coalescing data from all of the nodes in the network, where the computer for coalescing data processes the data from all of the nodes, evaluates the coalesced data, and then will send feedback to a local camera unit in that node.

15. A method for a passive optical camera-based system, comprising:
detecting a presence of one or more vehicles with one or more cameras in the passive optical camera-based system;
applying a detection algorithm to recognize of the presence of the one or more vehicles using one or more imaging processors and the one or more cameras to detect fluctuations in light intensity from scattered light and/or reflections off of that vehicle, where those scattered light and/or reflections are captured in images contained in a set of frames from the one or more cameras;

using the detection algorithm to evaluate data from the set of frames read into a frame grabber; and using the detection algorithm to find the scattered light and/or reflections captured in the images by performing a statistical significance test containing a transform algorithm on the set of frames, i) to transform fluctuations in light intensity over time to find a frequency with the most energy for each pixel, ii) apply a minimum threshold for candidate pixels set at greater than a noise band, iii) calculate significance in frequency space, iv) assigned statistical significance scores to each candidate pixel, and then v) correlate key frequencies for adjacent pixels.

16. The method of claim 15, further comprising:

using two or more cameras mounted in the system so that each camera is configured to scan designated regions of the sky to enhance coverage;

interrupting a scan of at least two cameras and dwelling on a potential detected vehicle and coordinating the at least two cameras to converge on the potential detected vehicle to get stereo data, either stereo vision and/or triangulation, for determining range to the vehicle detection candidate; and plotting and storing 3D trajectories of the vehicle detection candidate.

17. The method of claim 15, further comprising:

using path prediction logic to predict a motion in 3D of one or multiple vehicles, where coordinates of a detected vehicle are passed to the path prediction logic that will predict the motion in 3D of one or more vehicles and at least one of i) provide predicted coordinates to another system and ii) provide, on a display screen, the vehicle's location highlighted on the display screen in real time.

18. The method of claim 17, further comprising:

using a graphical user interface to display detection results in real time on the display screen, where a composite image is generated in the graphical user interface, where the detection results are a highlighted outline around the detected vehicle in a scene image on the display screen, and determining one or more detected vehicles on data results from the detection algorithm using the statistical significance test on the scattered light and/or reflections i) that generated a sufficient score above a set threshold and ii) that were also checked for persistence over time as a positive detection of an vehicle verses a single erroneous noise spike.

* * * * *